United States Patent
Jungbluth et al.

(10) Patent No.: US 7,653,996 B2
(45) Date of Patent: Feb. 2, 2010

(54) METHOD OF REPAIRING A CRACK IN A TURBINE COMPONENT

(75) Inventors: Matthias Jungbluth, Berlin (DE); Jan Steinbach, Berlin (DE); Rolf Wilkenhöner, Kleinmachnow (DE)

(73) Assignee: Siemens Aktiengesellschaft, Munich (DE)

( * ) Notice: Subject to any disclaimer, the term of this patent is extended or adjusted under 35 U.S.C. 154(b) by 287 days.

(21) Appl. No.: 11/516,137

(22) Filed: Sep. 6, 2006

(65) Prior Publication Data

US 2007/0050976 A1    Mar. 8, 2007

(30) Foreign Application Priority Data

Sep. 6, 2005    (EP)    ................... 05019339

(51) Int. Cl.
| | |
|---|---|
| B23P 6/00 | (2006.01) |
| B21D 53/78 | (2006.01) |
| C22F 1/10 | (2006.01) |
| B22F 1/00 | (2006.01) |

(52) U.S. Cl. ................ 29/889.1; 29/402.09; 29/402.16; 148/513; 148/675; 228/119; 228/248.1

(58) Field of Classification Search ................ 29/889.1, 29/402.09, 402.16; 148/28, 527–530, 512, 148/513, 675; 228/194, 195, 193, 248.1, 228/119

See application file for complete search history.

(56) References Cited

U.S. PATENT DOCUMENTS

| | | | |
|---|---|---|---|
| 4,606,778 A * | 8/1986 | Jahnke | ........................ 148/527 |
| 5,666,643 A | 9/1997 | Chesnes et al. | |
| 5,964,963 A | 10/1999 | Turchan et al. | |
| 6,024,792 A | 2/2000 | Kurz et al. | |
| 6,520,401 B1 * | 2/2003 | Miglietti | ..................... 228/194 |
| 2004/0050913 A1 | 3/2004 | Philip | |
| 2005/0067061 A1 * | 3/2005 | Huang et al. | ................ 148/428 |

FOREIGN PATENT DOCUMENTS

| | | |
|---|---|---|
| EP | 0 412 397 A1 | 2/1991 |
| EP | 0 486 489 B1 | 5/1992 |
| EP | 0 786 017 B1 | 7/1997 |
| EP | 0 892 090 A1 | 1/1999 |
| EP | 1 204 776 B1 | 5/2002 |
| EP | 1 258 545 A1 | 11/2002 |
| EP | 1 306 454 A1 | 5/2003 |
| EP | 1 319 729 A1 | 6/2003 |
| WO | WO 99/67435 A1 | 12/1999 |
| WO | WO 00/44949 A1 | 8/2000 |

* cited by examiner

*Primary Examiner*—David P Bryant
*Assistant Examiner*—Sarang Afzali

(57) ABSTRACT

A method of repairing a crack in a component comprising a base material, in particular in a gas turbine blade, a suspension, which comprises a carrier liquid and at least one solid in the form of nanoparticles of the same material as the base material, being applied to the location to be repaired. A heat treatment of the component is carried out, the solid in the form of nanoparticles being melted and a bond with the base material being formed. During the heat treatment, the component is exposed to a thermal shock, in which a maximum temperature which corresponds to the melting temperature of the nanoparticles is reached. The nano size of the particles in the suspension causes a lowering of the melting point of these particles to take place, so that the structure of the base material does not change even at the melting temperature of the nanoparticles.

13 Claims, 5 Drawing Sheets

METHOD OF REPAIRING A CRACK IN A TURBINE COMPONENT

CROSS REFERENCE TO RELATED APPLICATIONS

This application claims the benefits of European Patent application No. 05019339.0 filed Sep. 6, 2005 and is incorporated by reference herein in its entirety.

FIELD OF THE INVENTION

The invention relates to a method of repairing a crack in a component comprising a base material, in particular in a gas turbine blade, a suspension, which comprises a carrier liquid and at least one solid in the form of nanoparticles, being applied to the location to be repaired and a heat treatment of the component being carried out, the solid in the form of nanoparticles being melted and a bond with the base material being formed.

BACKGROUND OF THE INVENTION

Components that are subjected to considerable loading, such as turbine blades for instance, undergo high thermal and mechanical stress during operation, possibly leading to instances of material fatigue and as a consequence to cracks. Since the production of components which are exposed to a very high temperature during operation, such as for example components of a gas turbine, is relatively costly, it is generally endeavored to repair such components when they are damaged. This makes the component serviceable again and allows it to be used for a further period between inspections.

Furthermore, nowadays materials which have an oriented microstructure instead of a polycrystalline structure are being increasingly used for producing components of turbines, since these materials have better material properties, in particular in the high temperature range. The repair of such components is nevertheless made more difficult by the fact that during heat treatment of the material there is the risk of the repaired location no longer having an oriented microstructure.

One possible way of repairing damaged components is, for example, welding. However, welding methods should be avoided when repairing components that are subjected to considerable loading, in particular those which have an oriented structure, since they melt the base material of the component. Therefore, structurally bearing regions of a component must not be welded, since the integrity of the oriented structure would be lost as a result of the melting of the base material.

A further possible way of repairing damaged components is soldering. In the case of the conventional soldering methods, a solder is applied to the base material in the region of the damage and bonded to the base material by means of exposure to heat. However, in the case of the previously customary procedure, after the soldering the soldered location has inferior material properties than the surrounding base material, for example it does not have an oriented microstructure.

US 2004/0050913 describes a further method of repairing a component of a gas turbine by means of a solder with nanoparticles dispersed in a carrier liquid. The solder is applied to the cleaned surface of the location to be repaired and the component is heat-treated for four hours at a temperature of approximately 2120° F. (1433 K) in a vacuum of 0.3 Pa, the temperature increase being maintained for 10 minutes at approximately 800° F. (700 K) and 1600° F. (1144 K). Subsequently, the temperature is reduced by means of an inert gas, maintained for 20 minutes at 1000° F. (811 K) and then the component is cooled to room temperature. During the heat treatment, the nanoparticles melt at a temperature which is significantly lower than the melting temperature of the microparticles that are usually used in soldering. This dispenses with the need to add agents which lower the melting point, which have to be added in the case of most soldering methods for repairing gas turbines and which impair the material properties of the repaired location.

SUMMARY OF THE INVENTION

The present invention is based on the object of providing an improved heat treatment for repairing a crack in a component. This object is achieved according to the invention by a method with the features of claim 1. According to this, during the heat treatment, the component is exposed to a thermal shock.

In a heat treatment of a material at very high temperatures, undesired changes occur in the structure of the material. It is therefore particularly advantageous that the amount of heat introduced into a component is kept low during the repair of the component. This is achieved with the aid of a brief thermal shock, i.e. the temperature is abruptly increased and maintained at the higher temperature level for a short time in the heat treatment. During the thermal shock, the melting process of the nanoparticles of the suspension takes place and a bond with the base material is formed.

To be regarded as a further very important advantage of this development is that the nano size of the particles in the suspension causes a lowering of the melting point of these particles to take place. This is explained by the lower activation energy for releasing atoms on the surface of a particle of nano size in comparison with a larger particle. Consequently, the nanoparticles allow a heat treatment of the component at a temperature at which only the nanopowder melts and the structure of the base material does not change. A further advantage that is obtained by lowering the melting point of the nanoparticles is that the use of nanoparticles dispenses with the need for an agent lowering the melting point, which usually gives rise to brittle phases in the repaired location, or at least significantly reduces the amount of such an agent in the solder.

Furthermore, the success of the brief heat treatment at very high temperature is ensured by the physical properties of the nanoparticles. Nanoparticles have a very high surface/volume ratio and, as a result, melt more quickly than conventional powders. In particular in the case of components of which the base material has an oriented microstructure, this shorter heat treatment is of great significance, since it reduces the risk of recrystallization.

Nanoparticles cannot be fed directly by means of a powder conveyor on account of their particle size, since they would be dispersed very widely. For that reason, their dispersion in a carrier liquid represents a very good possible way of applying the nanoparticles effectively to the location to be repaired. The flowing properties of the suspension thereby created can be used to make the nanoparticles penetrate deep into the crack. Thanks to the capillary forces of the suspension, the nanoparticles are even capable of penetrating into very narrow branches of the crack and filling them.

Preferably, the maximum temperature during the heat treatment is reached in the thermal shock, which maximum temperature lies below the melting temperature of the base material. The maximum temperature is chosen such that the nanoparticles melt during the thermal shock and produce a stable and secure bond with the base material. However, the processes which lead to the changing of the state of aggregation of the nanoparticles do not cause the base material to liquefy. The structure of the base material is not impaired by these processes and the repaired component can continue to meet the high requirements in its use.

It is preferred for the maximum temperature during the heat treatment to lie between 50 K and 100 K below the melting temperature of the base material. The maximum temperature is dependent on the material of the nanoparticles and is chosen such that, at this temperature, they melt and a material bond with the base material takes place.

It is further preferred for the duration of the thermal shock to be less than 30 minutes and lies in particular between 5 minutes and 10 minutes. In combination with a suitable maximum temperature, a brief thermal shock is carried out, causing no significant impairment of the structure of the base material.

In a preferred embodiment, a temperature increase of up to 100 K, and in particular between 30 K and 70 K, is performed in the thermal shock. Experience has shown that a temperature increase of this order of magnitude is particularly suitable.

The thermal shock is expediently carried out after reaching a temperature in the region of the solution annealing temperature. The solution annealing temperature for austenitic steels is about 1273 K to 1373 K.

The substance in the form of nanoparticles advantageously consists of the same material as the base material. This is the best prerequisite for a secure bond of the nanoparticles with the base material, since both have virtually the same properties and structure.

With preference, the nanoparticles have a size of at most 100 nm. As a result, the nanoparticles are capable of penetrating into very. narrow cracks, in particular in those which have a crack width in the range between 10 μm and 100 μm. This crack width is significantly less than the minimum width of the cracks that can be effectively repaired by means of conventional techniques. Thanks to the capillary forces of the suspension, the nanoparticles penetrate further within the crack into its branches and provide complete filling of the crack.

An organic solution is preferably used as the carrier liquid. Particularly suited for this are alcohols—ethanol, propanol, etc. Water is likewise suitable as a carrier liquid. The decisive criterion for the composition of the suspension is that the carrier liquid does not chemically react with the nanoparticles nor lead to oxidation or corrosion. In such a suspension, the nanoparticles are well protected from environmental influences. When the component is heated up, the organic carrier liquid evaporates very quickly, and consequently has no influence on the production of the material bond between the nanoparticles and the base material.

In a preferred embodiment, the volume fraction of the nanoparticles in the suspension is over 50%. As a result, a high proportion of base material is brought into the crack by means of the suspension.

In a further advantageous embodiment, the suspension has a wetting agent. The wetting agent, also known as a dispersing agent, is added to the suspension in order to induce a better distribution of the nanosolid in the carrier liquid and avoid an agglomeration of the nanoparticles in the suspension. The wetting agent wets the surface of the nanoparticles and facilitates their dispersion in the carrier liquid, in that it lowers the interfacial surface tension between the solid and the liquid. Surfactants are used for example as the wetting agent. The wetting agent likewise evaporates in an early stage of the heat treatment.

The mass fraction of the wetting agent in the suspension is expediently between 0.1 g/l and 1 g/l, in particular between 0.2 g/l and 0.6 g/l.

BRIEF DESCRIPTION OF THE DRAWINGS

The further explanation of the method is based on the drawing. In the five figures.

DETAILED DESCRIPTION OF THE INVENTION

Figure 1:
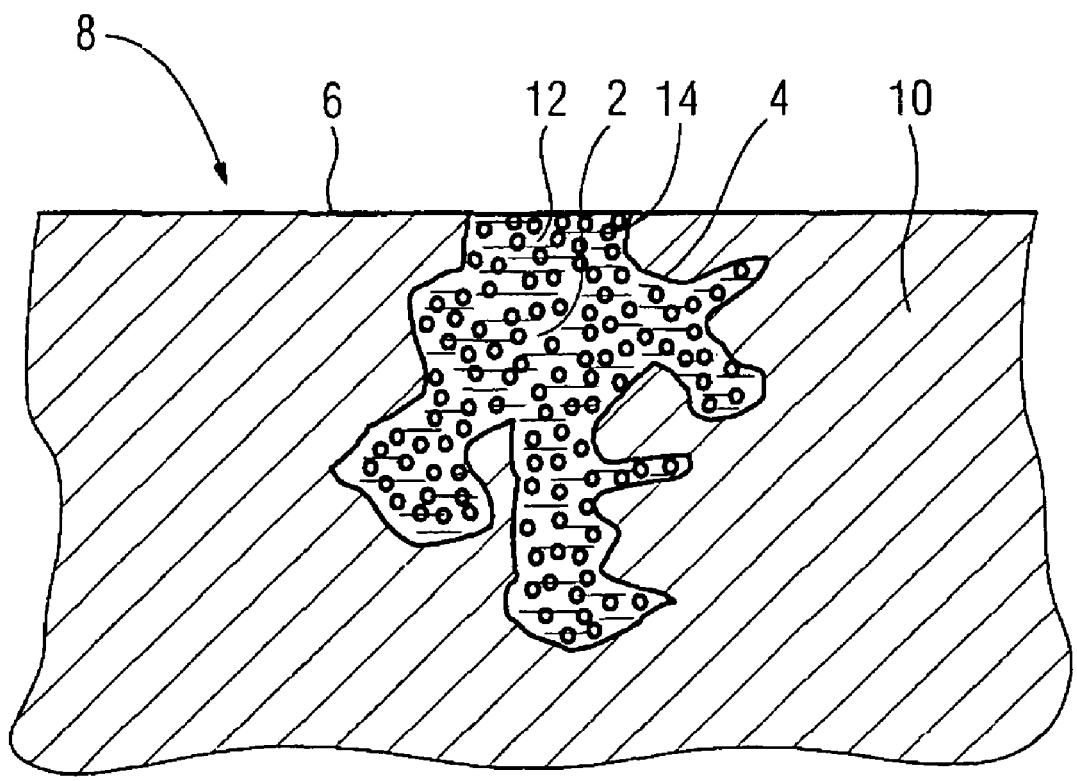
FIG. 1 shows a crack filled with a suspension comprising nanoparticles.

In FIG. 1, a crack 4 filled with a suspension 2 is shown.

The crack 4 is on the surface 6 of a component 8 formed from a base material 10 (combustion chamber element 155 (FIG. 4) or housing 138 (FIG. 5)), in this exemplary embodiment a turbine blade 120, 130 (FIG. 3), and has an irregular branched form. The base material 10 is a metal alloy with a polycrystalline structure or an oriented microstructure. The suspension 2 comprises a carrier liquid 12 of alcohol or water and a plurality of nanoparticles 14, which consist of the same material as the base material and are dispersed in the carrier liquid 12.

The nanoparticles 14 have a size between 50 nm and 100 nm and can consequently be divided into a number of fractions with different particle sizes. By mixing a number of fractions, an improvement in the degree of filling of the crack 4 is achieved, since in this way the nanoparticles 14 of the smaller fractions fit into the interstices of the larger fractions. In order to prevent an agglomeration of the nanoparticles 14, their surface is wetted with a wetting agent, such as for example surfactants.

A soldering filler may also be added to the suspension 2. The addition of a conventional soldering filler is desired in particular whenever the temperature range between the melting temperature of the base material 10 and the melting temperature of the nanoparticles 14 is not very great and the duration of the thermal shock is to be short. During the heat treatment, the soldering filler will melt first and form a bond between the nanoparticles 14 and the base material 10. Even if the nanoparticles 14 did not melt completely during the thermal shock, a material bond would be obtained between the filling in the crack 4 and the base material 10 of the component 8. All metals or metal alloys with a melting point lower than that of the nanoparticles 14 and higher than the operating temperature of the component 8 may be used as the soldering filler.

Furthermore, it is possible to add to the suspension 2 agents which lower the melting point. The use of agents which lower the melting point, such as for example boron, have the effect of achieving a still lower melting temperature of the nanoparticles 14 in the repair of the component 8 and, as a result, of keeping the base material 10 intact.

Since the nanoparticles 14 cause a reduction in the amount of heat introduced during the repair on account of their physical properties, it is possible to dispense with a soldering filler and an agent which reduces the melting point if there is an adequate temperature range between the melting temperature of the nanoparticles 14 and the melting temperature of the base material 10.

Figure 2:
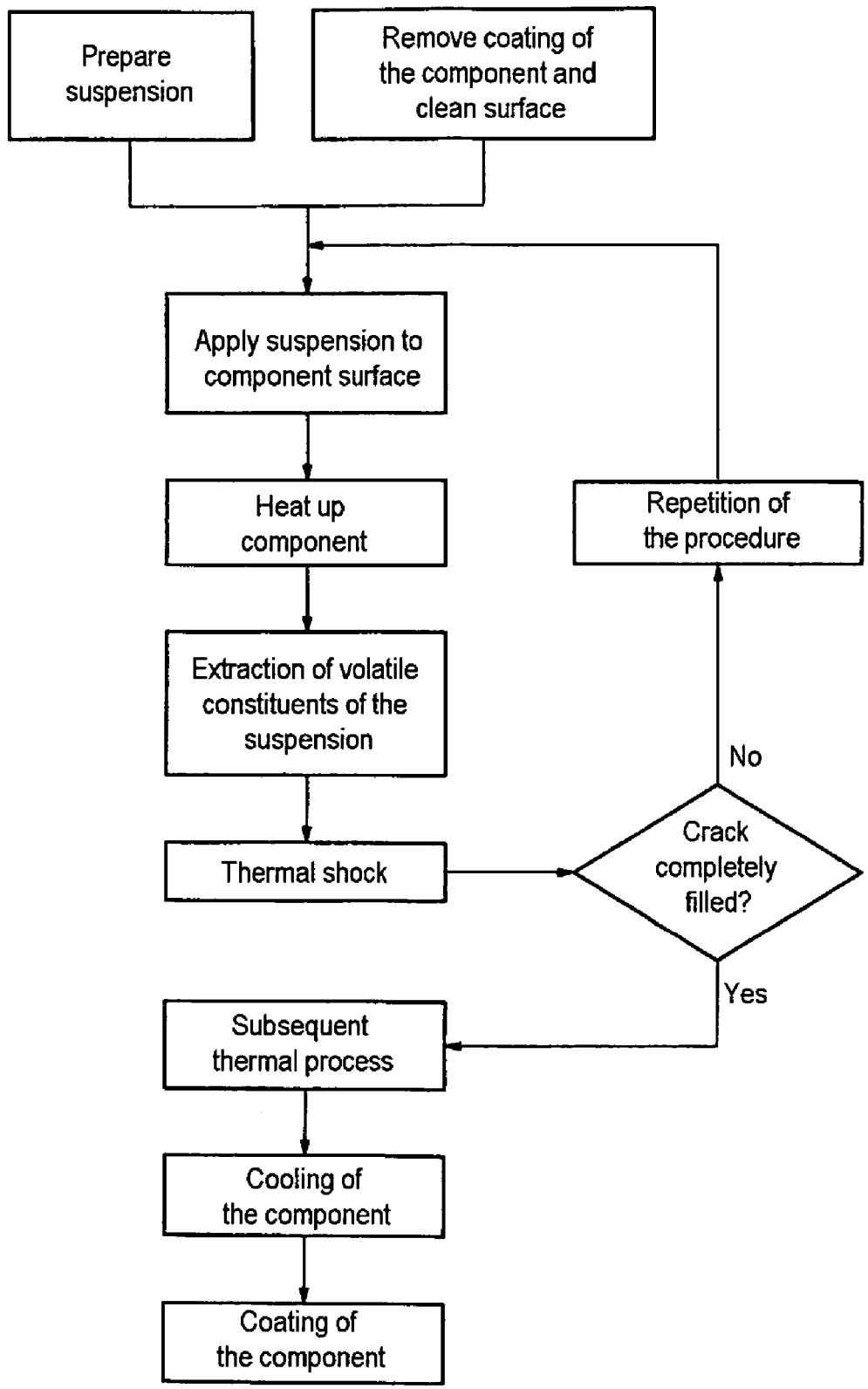
FIG. 2 shows a more detailed description of the method steps on the basis of a block diagram.

In order to ensure secure and effective repair of the damaged component by means of the suspension 2 according to FIG. 1, the repair must be processed in a specific way, which is shown in detail in the form of a block diagram in FIG. 2.

Firstly, the suspension 2 is prepared from the carrier liquid 12 and the nanoparticles 14, which do not dissolve in the carrier liquid 12 or bond chemically with it.

Before the suspension 2 is applied to the surface 6 of the component 8, the existing coating is removed and the surface 6 is cleaned in a suitable way.

The suspension 2 is applied to the damaged location and it penetrates into the crack 4 on account of gravitational forces. The crack 4 has many branches and depressions in the micro range, into which the suspension 2 penetrates thanks to its capillary forces, and consequently completely fills the crack 4. Utilizing the capillary forces to reach all the small depressions of the damaged surface is a very great advantage of this method over other conventional repair methods, in which a powder is introduced by means of a powder conveyor or a paste comprising powder is applied over the crack, but is more viscous than the suspension 2 and does not have particularly good flow properties.

In a next step, the component 8 is introduced into a vacuum furnace, where the air is first removed from the furnace by pumping it out or purging with an inert gas. A suitable temperature program is chosen and the vacuum furnace is heated up, the carrier liquid 12 and wetting agent evaporating and the filling of the crack 4 being compacted.

After reaching approximately the solution annealing temperature of the base material 10, the component 8 is exposed to a thermal shock of approximately 5 to 10 minutes, in which the temperature is increased abruptly by approximately 50 K. In this thermal shock, the maximum temperature during the heat treatment is reached, which is higher than the operating temperature of the component 8, but still lies below the melting temperature of the base material 10 by about 60 K. In this respect, it must be ensured that the melting point of the nanoparticles lies in this temperature interval. The nanoparticles, the physical properties of which are changed on account of their size, already melt at the maximum temperature and form an effective bond with the base material. In the thermal shock, it is of great advantage if all the nanoparticles heat up as uniformly as possible, since as a result they all melt approximately simultaneously and the duration of the thermal shock can be shortened.

It is possible that, after the suspension 2 has penetrated into the branches of the crack and has been compacted after the evaporation of the carrier liquid 12, the filling has settled to the bottom of the crack and the crack 4 is not completely filled. In this case, suspension 2 is applied once again and the heat treatment including the thermal shock is repeated.

When the crack 4 is completely filled, the repaired location is subsequently treated with heat, in order to achieve a homogenization of the structure.

After cooling the component 8, it is coated once again and is consequently ready again for use.

Figure 3:
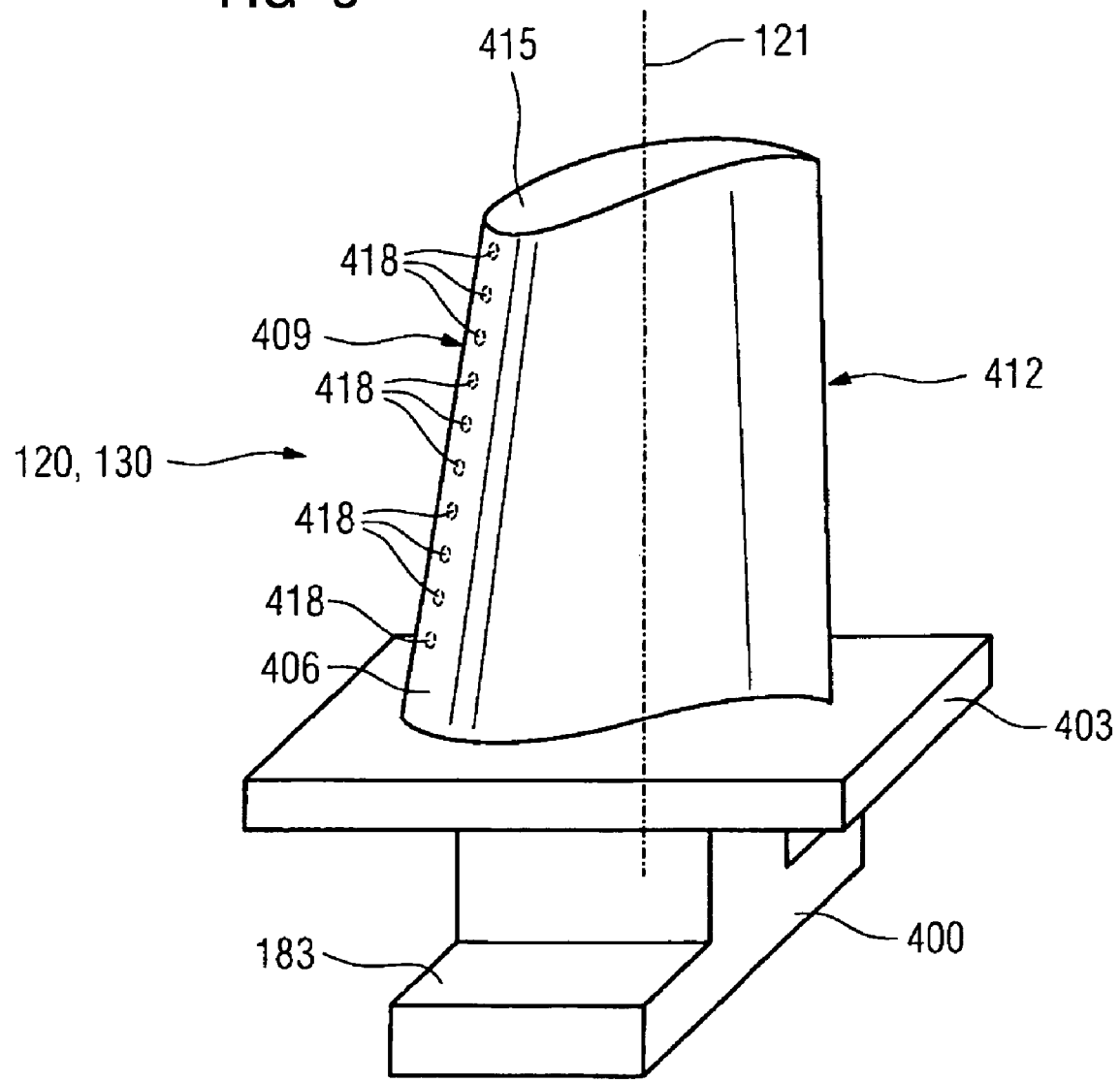
FIG. 3 shows a turbine blade.

FIG. 3 shows in a perspective view a moving blade 120 or stationary blade 130 of a turbomachine, which extends along a longitudinal axis 121.

The turbomachine may be a gas turbine of an aircraft or a power plant for generating electricity, a steam turbine or a compressor.

The blade 120, 130 has, following one after the other along the longitudinal axis 121, a fastening region 400, an adjoining blade platform 403 and a blade airfoil 406.

As a stationary blade 130, the blade 130 may have a further platform at its blade tip 415 (not represented).

In the fastening region 400 there is formed a blade root 183, which serves for the fastening of the blades 120, 130 to a shaft or a disk (not represented).

The blade root 183 is designed for example as a hammer head. Other designs as a firtree or dovetail root are possible.

The blade 120, 130 has for a medium which flows past the blade airfoil 406 a leading edge 409 and a trailing edge 412.

In the case of conventional blades 120, 130, solid metallic materials, in particular superalloys, are used for example in all the regions 400, 403, 406 of the blade 120, 130.

Such superalloys are known for example from EP 1 204 776 B1, EP 1 306 454, EP 1 319 729 A1, WO 99/67435 or WO 00/44949; these documents constitute part of the disclosure with respect to the chemical composition of the alloy.

The blade 120, 130 may in this case be produced by a casting method, also by means of directional solidification, by a forging method, by a milling method or combinations of these.

Workpieces with a monocrystalline structure or structures are used as components for machines which are exposed to high mechanical, thermal and/or chemical loads during operation.

The production of monocrystalline workpieces of this type takes place for example by directional solidification from the melt. This involves casting methods in which the liquid metallic alloy directionally solidifies to form the monocrystalline structure, i.e. to form the monocrystalline workpiece. Dendritic crystals are thereby oriented along the thermal flow and form either a columnar grain structure (i.e. grains which extend over the entire length of the workpiece and are commonly referred to here as directionally solidified) or a monocrystalline structure, i.e. the entire workpiece comprises a single crystal. In these methods, the transition to globulitic (polycrystalline) solidification must be avoided, since undirected growth necessarily causes the formation of transversal and longitudinal grain boundaries, which nullify the good properties of the directionally solidified or monocrystalline component.

While reference is being made generally to solidified structures, this is intended to mean both monocrystals, which have no grain boundaries or at most small-angle grain boundaries, and columnar crystal structures, which indeed have grain boundaries extending in the longitudinal direction but no transversal grain boundaries. These second-mentioned crystalline structures are also referred to as directionally solidified structures.

Such methods are known from U.S. Pat. No. 6,024,792 and EP 0 892 090 A1 ; these documents constitute part of the disclosure.

Similarly, the blades 120, 130 may have coatings against corrosion or oxidation, for example (MCrAlX; M is at least one element of the group comprising iron (Fe), cobalt (Co) and nickel (Ni), X is an active element and represents yttrium (Y) and/or silicon and/or at least one element of the rare earths, or hafnium (Hf)). Such alloys are known from EP 0 486 489 B1, EP 0 786 017 B1, EP 0 412 397 B1 or EP 1 306 454 A1, which are intended to constitute part of this disclosure with respect to the chemical composition of the alloy.

On the MCrAlX there may also be a heat insulating layer, which consists for example of $ZrO_2$, $Y_2O_4$-$ZrO_3$, i.e. it is not stabilized or is partly or completely stabilized by yttrium oxide and/or calcium oxide and/or magnesium oxide. Columnar grains are produced in the heat insulating layer by suitable coating methods, such as for example electron-beam physical vapor deposition (EB-PVD).

Refurbishment means that components 120, 130 may have to be freed of protective layers after use (for example by sandblasting). This is followed by removal of the corrosion and/or oxidation layers or products. If applicable, cracks in the component 120, 130 are then also repaired. This is followed by recoating of the component 120, 130 and renewed use of the component 120, 130.

The blade 120, 130 may be hollow or be of a solid form.

If the blade 120, 130 is to be cooled, it is hollow and may also have film cooling holes (represented by dashed lines).

Figure 4:
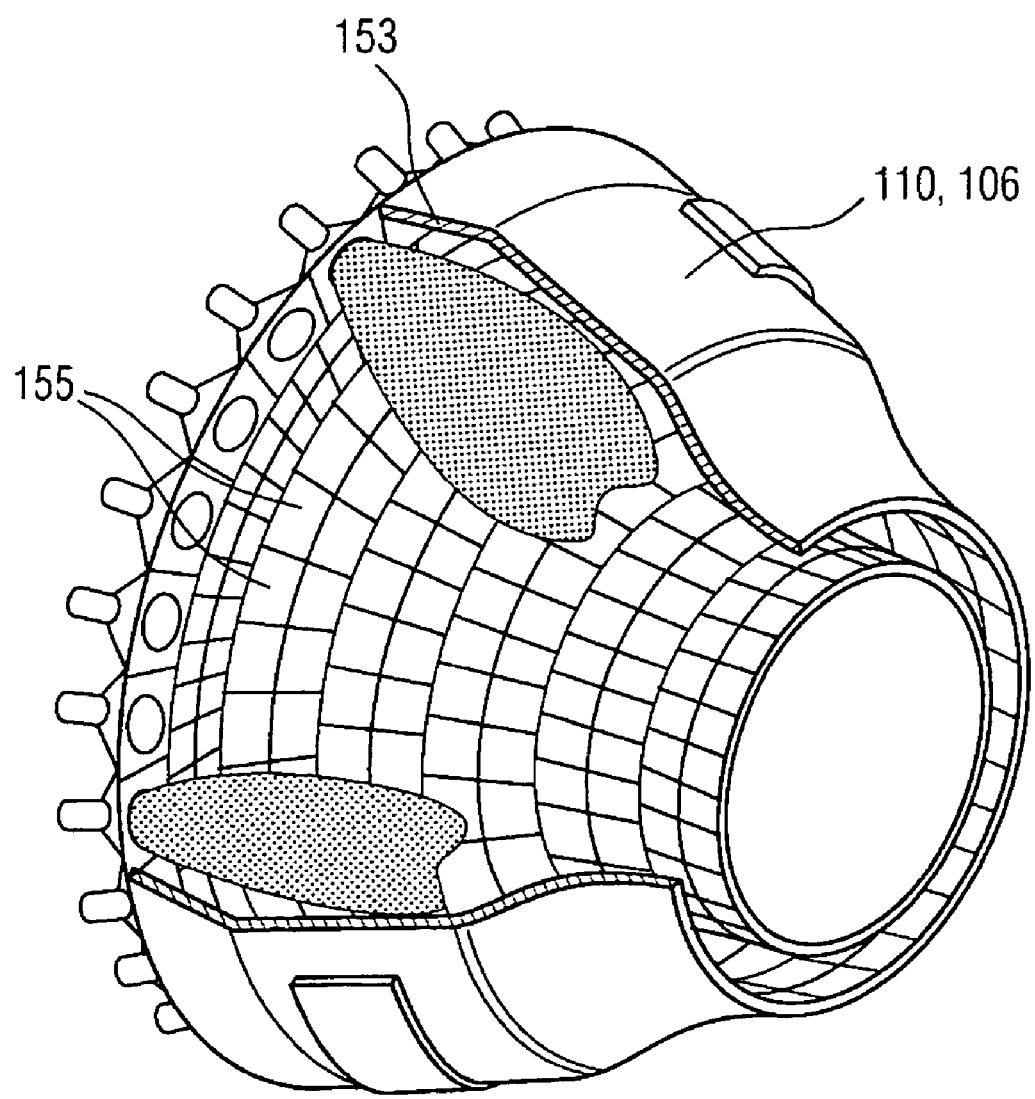
FIG. 4 shows a combustion chamber and FIG. 5 shows a gas turbine.
Figure 5:
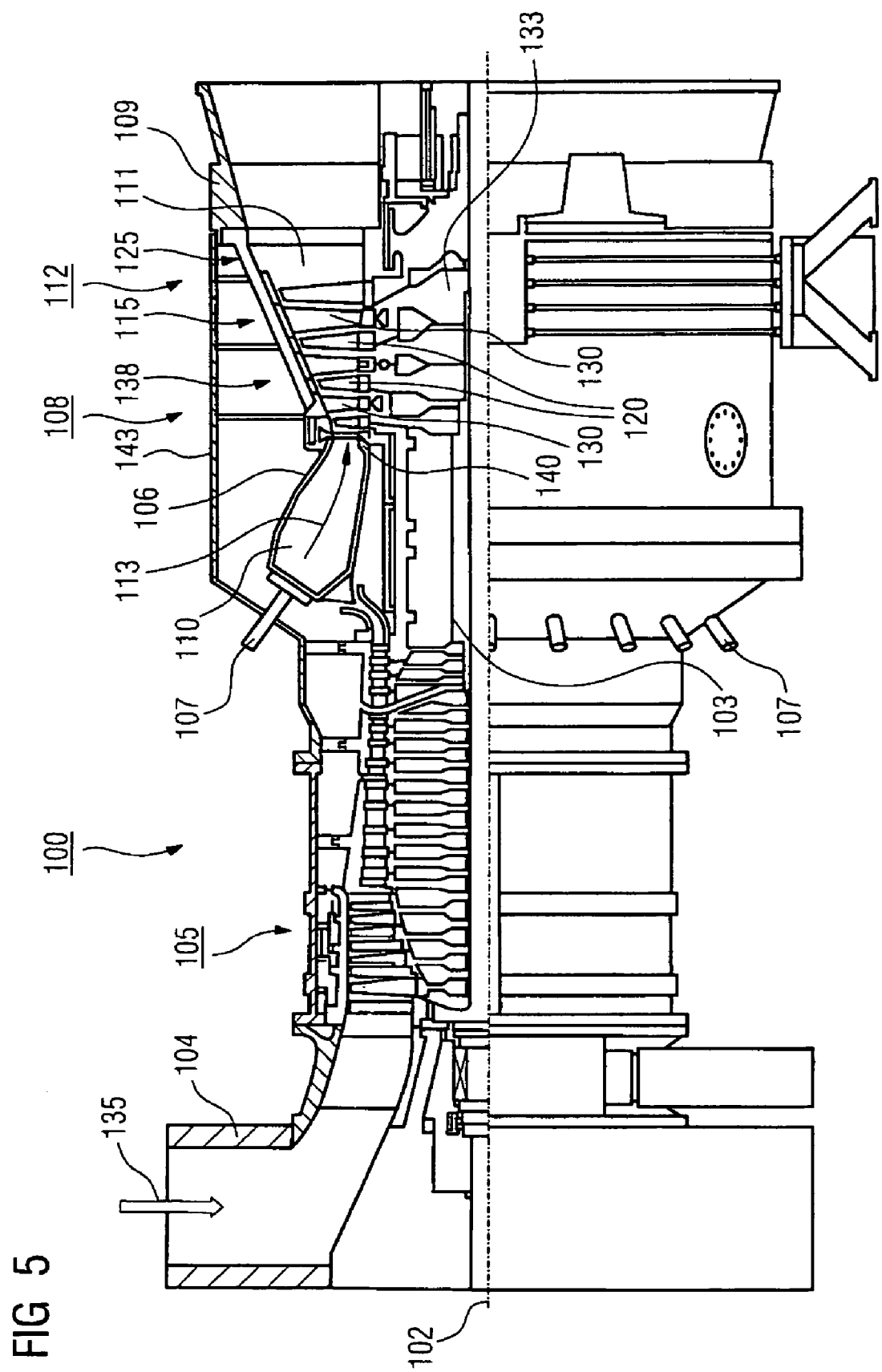

FIG. 4 shows a combustion chamber 110 of a gas turbine 100 (FIG. 5).

The combustion chamber 110 is designed for example as what is known as an annular combustion chamber, in which a multiplicity of burners 107, which are arranged around an axis of rotation 102 in the circumferential direction and produce flames 156, open out into a common combustion chamber space 154. For this purpose, the combustion chamber 110 is designed as a whole as an annular structure, which is positioned around the axis of rotation 102.

To achieve a comparatively high efficiency, the combustion chamber 110 is designed for a comparatively high temperature of the working medium M of approximately 1000° C. to 1600° C. To permit a comparatively long operating time even with these operating parameters that are unfavorable for the materials, the combustion chamber wall 153 is provided on its side facing the working medium M with an inner lining formed by heat shielding elements 155.

Each heat shielding element 155 of an alloy is provided on the working medium side with a particularly heat-resistant protective layer (MCrAlX layer and/or ceramic coating) or is produced from material that is resistant to high temperature (solid ceramic bricks).

These protective layers may be similar to the turbine blades, meaning for example (MCrAlX; M is at least one element of the group comprising iron (Fe), cobalt (Co) and nickel (Ni), X is an active element and represents yttrium (Y) and/or silicon and/or at least one element of the rare earths, or hafnium (Hf)). Such alloys are known from EP 0 486 489 B1, EP 0 786 017 B1, EP 0 412 397 B1 or EP 1 306 454 A1, which are intended to constitute part of this disclosure with respect to the chemical composition of the alloy.

On the MCrAlX there may also be a heat insulating layer, for example a ceramic heat insulating layer, which consists for example of $ZrO_2$, $Y_2O_4$—$ZrO_2$, i.e. it is not stabilized or is partly or completely stabilized by yttrium oxide and/or calcium oxide and/or magnesium oxide.

Columnar grains are produced in the heat insulating layer by suitable coating methods, such as for example electron-beam physical vapor deposition (EB-PVD).

Refurbishment means that heat shielding elements 155 may have to be freed of protective layers after use (for example by sandblasting). This is followed by removal of the corrosion and/or oxidation layers or products. If applicable, cracks in the heat shielding element 155 are then also repaired. This is followed by recoating of the heat shielding elements 155 and renewed use of the heat shielding elements 155.

On account of the high temperatures in the interior of the combustion chamber 110, a cooling system may also be provided for the heat shielding elements 155 or for their holding elements. The heat shielding elements 155 are then for example hollow and possibly also have film cooling holes (not represented) opening out into the combustion chamber space 154.

FIG. 5 shows by way of example a gas turbine 100 in a longitudinal partial section.

The gas turbine 100 has in the interior a rotor 103 with a shaft 101, which is rotatably mounted about an axis of rotation 102 and is also referred to as a turbine runner.

Following one another along the rotor 103 are an intake housing 104, a compressor 105, a combustion chamber 110, for example of a toroidal form, in particular an annular combustion chamber, with a number of coaxially arranged burners 107, a turbine 108 and the exhaust housing 109.

The annular combustion chamber 106 communicates with a hot gas duct 111, for example of an annular form. There, the turbine 108 is formed for example by four successive turbine stages 112.

Each turbine stage 112 is formed for example by two blade rings. As seen in the direction of flow of a working medium 113, a row of stationary blades 115 is followed in the hot gas duct 111 by a row 125 formed by moving blades 120.

The stationary blades 130 are in this case fastened to an inner housing 138 of a stator 143, whereas the moving blades 120 of a row 125 are attached to the rotor 103, for example by means of a turbine disk 133.

Coupled to the rotor 103 is a generator or a machine (not represented).

During the operation of the gas turbine 100, air 135 is sucked in by the compressor 105 through the intake housing 104 and compressed. The compressed air provided at the end of the compressor 105 on the turbine side is passed to the burners 107 and mixed there with a fuel. The mixture is then burned in the combustion chamber 110 to form the working medium 113. From there, the working medium 113 flows along the hot gas duct 111, past the stationary blades 130 and the moving blades 120. At the moving blades 120, the working medium 113 expands, transferring momentum, so that the moving blades 120 drive the rotor 103 and the latter drives the machine coupled to it.

The components that are exposed to the hot working medium 113 are subjected to thermal loads during the operation of the gas turbine 100. The stationary blades 130 and moving blades 120 of the first turbine stage 112, as seen in the direction of flow of the working medium 113, are thermally loaded the most, along with the heat shielding elements lining the annular combustion chamber 110.

In order to withstand the temperatures prevailing there, these may be cooled by means of a coolant.

Similarly, substrates of the components may have a directed structure, i.e. they are monocrystalline (SX structure), or have only longitudinally directed grains (DS structure).

Iron-, nickel- or cobalt-based superalloys are used for example as the material for the components, in particular for the turbine blade 120, 130 and components of the combustion chamber 110.

Such superalloys are known for example from EP 1 204 776 B1, EP 1 306 454, EP 1 319 729 A1, WO 99/67435 or WO 00/44949; these documents constitute part of the disclosure with respect to the chemical composition of the alloys.

The stationary blade 130 has a stationary blade root facing the inner housing 138 of the turbine 108 (not represented here) and a stationary blade head, lying opposite the stationary blade root. The stationary blade head is facing the rotor 103 and fixed to a fastening ring 140 of the stator 143.

The invention claimed is:

1. A method of repairing a crack in a gas turbine component having a base material characterized by an annealing temperature, comprising:
   forming a suspension comprising a carrier liquid and nanoparticles which are not soluble in the carrier liquid;
   applying the suspension to penetrate into the crack to be repaired;
   heating the suspension at a first temperature to evaporate carrier liquid with the nanoparticles being compacted; and
   further heating the component to a more elevated temperature below the annealing temperature, wherein the elevated temperature is approximately 50 K above the first temperature and below the melting temperature of the base material, to melt the nanoparticles and form a bond between the nanoparticles and the base material, the further heating at the more elevated temperature having a duration of less than 30 minutes.

2. The method as claimed in claim 1, wherein the nanoparticles are the same material as the base material.

3. The method as claimed in claim 2, wherein the nanoparticles have a size of 100 nm or less.

4. The method as claimed in claim 3, wherein the carrier liquid is an organic solution.

5. The method as claimed in claim 4, wherein a volume fraction of the nanoparticles in the suspension is greater than 50%.

6. The method as claimed in claim 5, wherein the suspension includes a wetting agent.

7. The method as claimed in claim 6, wherein a mass fraction of wetting agent in the suspension is between 0.1 and 1 g/l.

8. The method as claimed in claim 7, wherein the mass fraction of wetting agent in the suspension is between 0.2 and 0.6 g/l.

9. The method as claimed in claim 1, wherein the more elevated temperature is between 50 K and 100 K below the melting temperature of the base material.

10. The method as claimed in claim 9, wherein the more elevated temperature is up to 100 K above the first temperature.

11. The method as claimed in claim 10, wherein the more elevated temperature is between 30 K and 70 K above the first temperature.

12. The method as claimed in claim 1, wherein the further heating at the more elevated temperature has a duration between 5 minutes and 10 minutes and the more elevated temperature is 60 K below the melting temperature of the base material.

13. The method as claimed in claim 1, wherein the gas turbine component is a blade, vane or combustion system component.

* * * * *

UNITED STATES PATENT AND TRADEMARK OFFICE
CERTIFICATE OF CORRECTION

PATENT NO. : 7,653,996 B2 Page 1 of 1
APPLICATION NO. : 11/516137
DATED : February 2, 2010
INVENTOR(S) : Jungbluth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 330 days.

Signed and Sealed this

Twenty-third Day of November, 2010

David J. Kappos
*Director of the United States Patent and Trademark Office*